(12) United States Patent
Chiu et al.

(10) Patent No.: US 9,824,827 B2
(45) Date of Patent: Nov. 21, 2017

(54) METHOD FOR MAKING SOLID ELECTROLYTIC CAPACITOR PACKAGE STRUCTURE WITH IMPROVED CONDUCTIVE TERMINALS

(71) Applicant: APAQ TECHNOLOGY CO., LTD., Miaoli County (TW)

(72) Inventors: Chi-Hao Chiu, Hsinchu (TW); Ming-Tsung Chen, Changhua County (TW); Kun-Huang Chang, Hsinchu (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 247 days.

(21) Appl. No.: 14/598,356

(22) Filed: Jan. 16, 2015

(65) Prior Publication Data

US 2016/0118197 A1    Apr. 28, 2016

(30) Foreign Application Priority Data

Oct. 28, 2014    (TW) .............................. 103137178 A (51) Int. Cl.
*H01G 9/26*    (2006.01)
*H01G 9/15*    (2006.01)
(Continued)

(52) U.S. Cl.
CPC .............. *H01G 9/26* (2013.01); *H01G 2/065* (2013.01); *H01G 9/028* (2013.01); *H01G 9/055* (2013.01); *H01G 9/15* (2013.01)

(58) Field of Classification Search
CPC    H01G 9/15; H01G 9/055; H01G 9/08; H01G 9/10; H01G 9/14; H01G 9/008;
(Continued)

(56) References Cited

U.S. PATENT DOCUMENTS

| 5,083,234 A * | 1/1992 | Lehto | .................... G01L 9/0042 257/E21.599 |
| 8,759,124 B2 * | 6/2014 | Miyoshi | .............. H01L 25/0753 257/E33.056 |

(Continued)

FOREIGN PATENT DOCUMENTS

JP        05021290 A  *  1/1993    ............. H01G 9/028

*Primary Examiner* — John P Dulka
(74) *Attorney, Agent, or Firm* — Li & Cai Intellectual Property (USA) Office (57) ABSTRACT

The instant disclosure relates to a method for making solid electrolytic capacitor package structure with improved conductive terminals. The first step is to provide at least one conductive terminal having an electrical contact portion and a lead-out portion. The next step is to remove a portion of mantle layer from the surface of the core layer of at least one conductive terminal by a dry-type process. The next step is to sequentially stack together a plurality of stacked-type capacitors to form a capacitor unit and then electrically connect the capacitor unit to at least one conductive terminal. The next step is to form a package body to encapsulate the capacitor unit and the electrical contact portion of at least one conductive terminal. The last step is to bend the lead-out portion of at least one conductive terminal to an axis that extends along the surface of the package body.

6 Claims, 6 Drawing Sheets

(51) Int. Cl.
*H01G 9/028* (2006.01)
*H01G 9/055* (2006.01)
*H01G 2/06* (2006.01)

(58) Field of Classification Search
CPC .......... H01G 9/012; H01G 9/04; H01G 9/065;
H01G 9/26; H01G 9/0029; H01G 9/00;
H01G 9/16; H01G 9/06; H01G 9/145
See application file for complete search history.

(56) References Cited

U.S. PATENT DOCUMENTS

| | | | |
|---|---|---|---|
| 9,159,490 B2 * | 10/2015 | Chiu .................. | H01G 2/10 |
| 2002/0189808 A1 * | 12/2002 | Nguyen .............. | E21B 43/045 |
| | | | 166/278 |
| 2004/0093688 A1 * | 5/2004 | Lucht ................ | B60B 33/0002 |
| | | | 16/38 |
| 2006/0175943 A1 * | 8/2006 | Paradis ............. | A47B 47/0066 |
| | | | 312/223.1 |
| 2009/0237865 A1 * | 9/2009 | Komazawa .......... | H01G 9/012 |
| | | | 361/528 |
| 2015/0194270 A1 * | 7/2015 | Katsube ............ | H01G 9/15 |
| | | | 174/257 |
| 2015/0357122 A1 * | 12/2015 | Matsubara .......... | H01G 9/15 |
| | | | 361/528 |

\* cited by examiner

METHOD FOR MAKING SOLID ELECTROLYTIC CAPACITOR PACKAGE STRUCTURE WITH IMPROVED CONDUCTIVE TERMINALS

BACKGROUND OF THE INVENTION

1. Field of the Invention

The instant disclosure relates to a packaging technology of passive elements; in particular, to a method for making solid electrolytic capacitor package structure with improved conductive terminals.

2. Description of Related Art

The capacitor is an indispensable element in many electronic products. Various applications of capacitors include home appliances, computer motherboards and peripherals, power supplies, communication products and automobiles. The capacitors such as solid electrolytic capacitors are mainly used to provide filtering, bypassing, rectifying, coupling, blocking or transforming function. With the rapid advancement of semiconductor processing technology, packaged electronic products follows the trend of miniaturization, high electrical performance, multi-function, high reliability, and RoHS Compliance. The wet electrolytic capacitor cannot accommodate the requirements of the electronic products, thus, the solid state electrolytic capacitor is developed.

There are many different types of substrates that can be used for the solid-state electrolytic capacitor. Currently, aluminum and titanium are the most commonly used materials for solid-state electrolytic capacitors. To increase capacitance, a plurality of solid-state electrolytic capacitors is laminated together in parallel to a capacitor unit. Thus, a higher capacitance can be obtained, in which total capacitance is the sum of all values from all capacitor units.

However, for the conventional capacitor package structure, there exist voids between the package body and the conductive terminal. As a result, it has been found that degradation of electrical properties of the conventional capacitor package structure can occur while atmospheric moisture invades the package body. Worst of all, the capacitor elements inside the package body can be damaged to reduce its life time.

SUMMARY OF THE INVENTION

One aspect of the instant disclosure relates to a method for making solid electrolytic capacitor package structure with improved conductive terminal. The solid electrolytic capacitor package structure made by the same can solve the problems of bad sealability and lower reliability.

One of the embodiments of the instant disclosure provides a method for making solid electrolytic capacitor package structure with improved conductive terminals, comprising: providing at least one conductive terminal having a core layer and a mantle layer enclosing the core layer; removing a portion of the mantle layer from the surface of the core layer of at least one conductive terminal by a dry-type process, wherein the core layer of at least one conductive terminal has a junction region and a bending region on the exposed surface thereof; sequentially stacking together a plurality of stacked-type capacitors to form a capacitor unit and electrically connecting the capacitor unit to at least one conductive terminal; forming a package body to encapsulate the capacitor unit, and the package body being adapted to define an electrical contact portion enclosed by the package body and a lead-out portion outside the package body on at least one conductive terminal, wherein said exposed surface extends a distance forward and downward from the junction of the electrical contact portion and the lead-out portion of at least one conductive terminal, and wherein the junction region of said exposed surface is covered with the package body; and bending the lead-out portion of at least one conductive terminal to an axis that extends along the surface of the package body.

Another one of the embodiments of the instant disclosure provides a method for making solid electrolytic capacitor package structure with improved conductive terminals, comprising: the following steps: providing an anode terminal and a cathode terminal separated from the anode terminal, wherein the anode terminal has a first core layer and a first mantle layer enclosing the first core layer, and the cathode terminal has a second core layer and a second mantle layer enclosing the second core layer; removing a portion of the first mantle layer from the surface of the first core layer of the anode terminal and a portion of the second mantle layer from the surface of the second core layer of the cathode terminal by a dry-type process, wherein the first core layer of the anode terminal has a first junction region and a first bending region on a first exposed surface thereof, and the second core layer of the cathode terminal has a second junction region and a second bending region on a second exposed surface thereof; sequentially stacking together a plurality of stacked-type capacitors to form a capacitor unit and electrically connecting the capacitor unit to the anode terminal and the cathode terminal; forming a package body to encapsulate the capacitor unit, and the package body being adapted to define a first electrical contact portion enclosed by the package body and a first lead-out portion outside the package body on the anode terminal and a second electrical contact portion enclosed by the package body and a second lead-out portion outside the package body on the cathode terminal, and bending the first lead-out portion of the anode terminal and the second lead-out portion of the cathode terminal to an axis that extends along the surface of the package body; wherein said first exposed surface extends a distance forward and downward from the junction of the first electrical contact portion and the first lead-out portion of the anode terminal, said second exposed surface extends a distance forward and downward from the junction of the second electrical contact portion and the second lead-out portion of the cathode terminal; wherein the first junction region of said first exposed surface and the second junction region of said second exposed surface are covered with the package body.

Based on the above, a portion of the mantle layer can be removed from the surface of the core layer of at least one conductive terminal by a dry-type process. In other words, the core layer has an exposed surface exposed from the mantle layer. Thus, the sealing property between the package body and at least one conductive terminal can be improved.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

In view of the lack of the above-mentioned background technology, the present invention provides a method for making the solid electrolytic capacitor package structure having the advantages of easy processing, low cost, and large-scale fabrication. The main technical feature is that the mantle layers of the anode and cathode terminals are patterned by a laser trimming process which is configured to replace the conventional chemical etching process. Therefore, the surrounding edge portion of the package body can fittingly abut against the conductive terminal, and sealing property and reliability of the solid electrolytic capacitor package structure can be enhanced.

The First Embodiment

Figure 1:
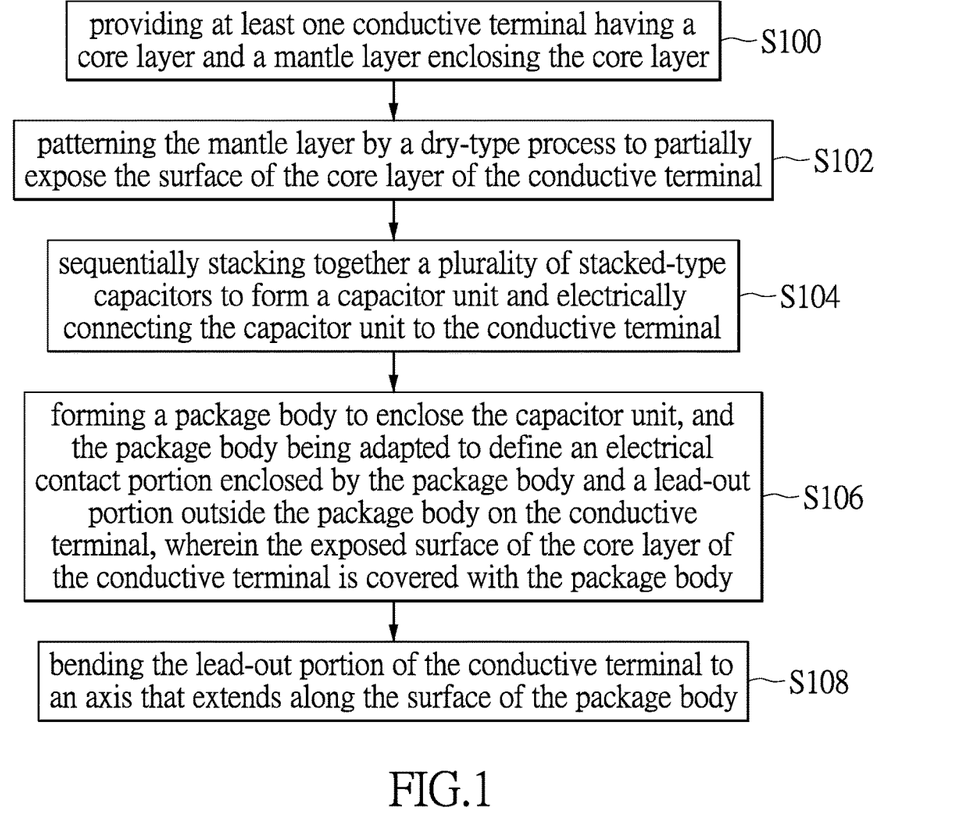
FIG. 1 shows a flowchart of the method for making solid electrolytic capacitor package structure with improved conductive terminals according to the first embodiment of the instant disclosure.

FIG. 1 shows a flowchart illustrating a method for making the solid electrolytic capacitor package structure with improved conductive terminals according to the first embodiment of the present invention. The method, as shown in FIG. 1, comprises the steps of: providing at least one conductive terminal having a core layer and a mantle layer enclosing the core layer (S100); patterning the conductive terminal by a dry-type process to partially expose the core layer of the conductive terminal (S102); sequentially stacking together a plurality of stacked-type capacitors to form a capacitor unit and electrically connecting the capacitor unit to the conductive terminal (S104); forming a package body to encapsulate the capacitor unit and being adapted to define an electrical contact portion enclosed by the package body and a lead-out portion outside the package body on the conductive terminal, wherein the exposed surface of the core layer of the conductive terminal is covered with the package body (S106); and bending the lead-out portion of the conductive terminal to an axis that extends along the surface of the package body (S108).

Figure 2:
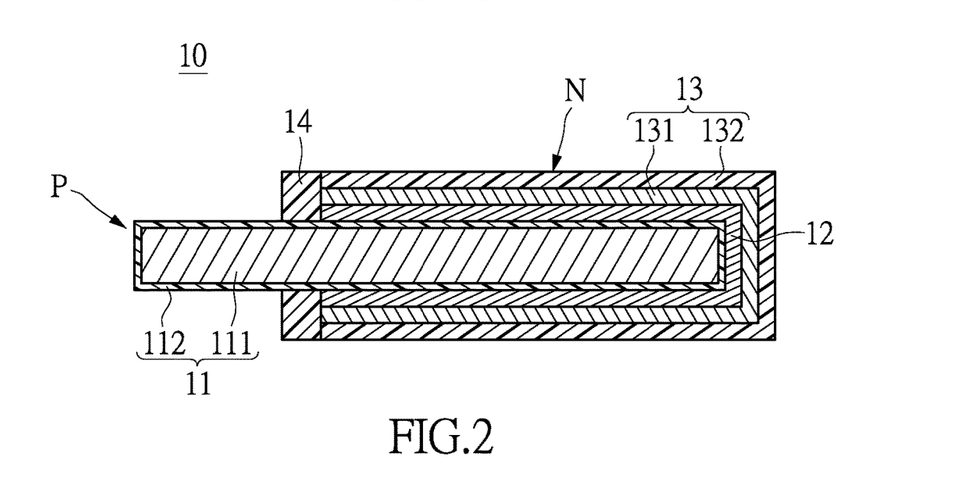
FIG. 2 shows a cross-sectional view of the stacked-type capacitor of the solid electrolytic capacitor package structure according to the first embodiment of the instant disclosure.

Please refer to FIG. 2. The following now describes the basic structure and characteristics of a stacked type capacitor (also known as chip type capacitor). The instant disclosure also relates to a package means of packaging a plurality of stacked type capacitors is stacked to form a capacitor module. The stacked type capacitor 10, as shown in FIG. 2, includes a substrate layer 11, a conductive polymer layer 12, and an electrode layer 13. The substrate layer 11 consists of a valve metal foil 111 and an oxidation film 112 enclosing the valve metal foil 111, being separated into an anode portion P and a cathode portion N by an insulating layer 14. The electrode layer 13 includes double layers of a carbon paste layer 131 and a silver paste layer 132.

Figure 3:
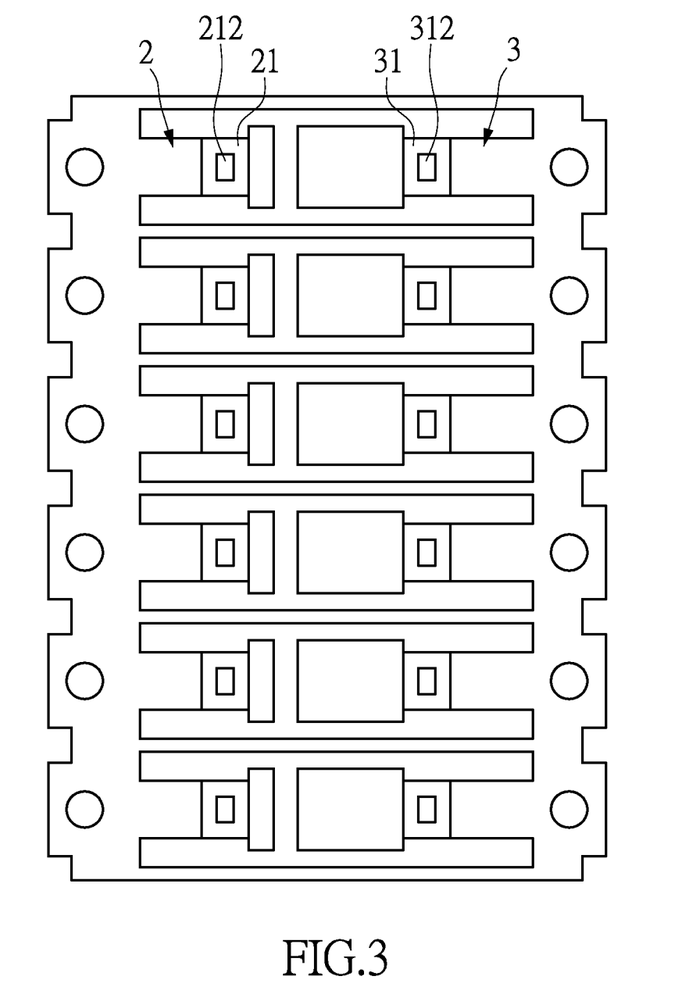
FIG. 3 shows a top, schematic view of the stacked-type capacitor disposed on the anode and cathode terminals according to the first embodiment of the instant disclosure.
Figure 4:
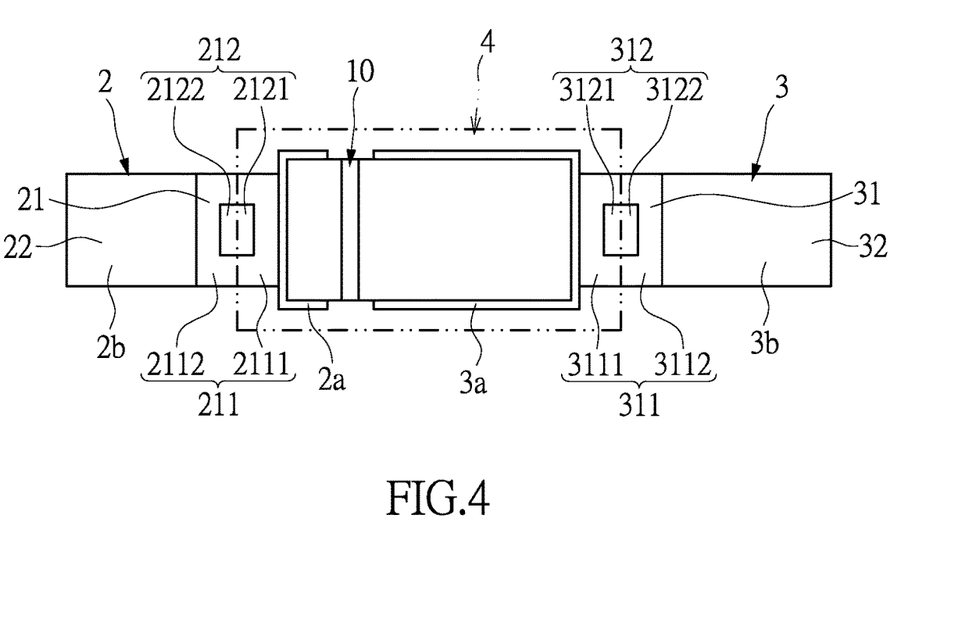
FIG. 4 shows a top, schematic view of the solid electrolytic capacitor package structure according to the first embodiment of the instant disclosure.
Figure 5:
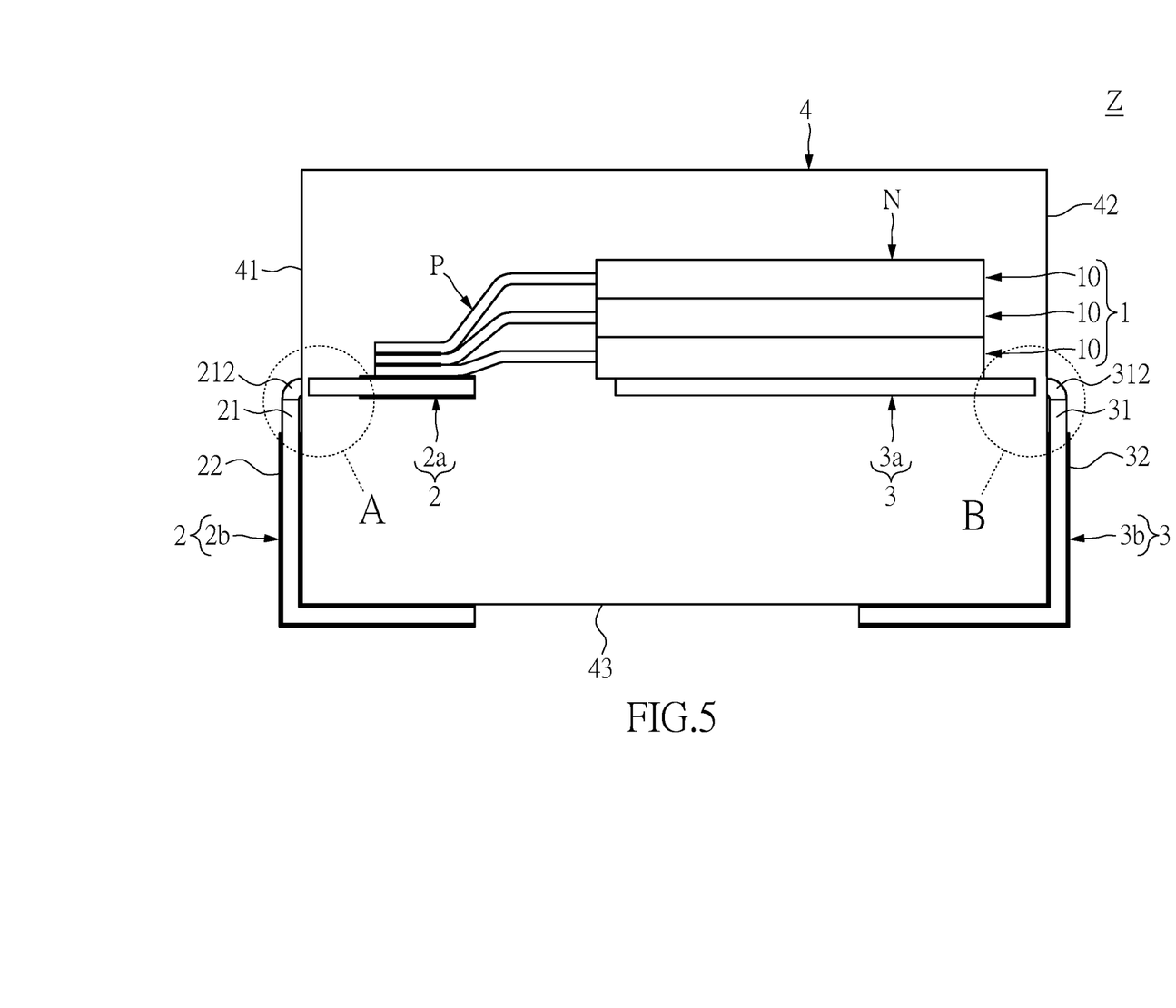
FIG. 5 shows a lateral, schematic view of the solid electrolytic capacitor package structure according to the first embodiment of the instant disclosure.

Please refer to FIG. 3, FIG. 4, and FIG. 5. In the first step S100, an anode terminal 2 and a cathode terminal 3 are provided. The anode terminal 2 includes a first core layer 21 and a first mantle layer 22 enclosing the first core layer 21, configured to electrically contact the anode portion P of the lowest stacked type capacitor 10. The cathode terminal 3 includes a second core layer 31 and a second mantle layer 32 enclosing the second core layer 31, configured to electrically contact the cathode portion N of the lowest stacked type capacitor 10.

Specifically, the first and second core layers 21, 31 of the instant disclosure can be made of Cu (copper) or Cu alloy, where the materials are not restricted thereto. The first core layer 21 has a first through-hole 212 formed by stamping, and the second core layer 31 has a second through-hole 312 formed by stamping. The first and second through-holes 212, 312 are configured to match a packaging mold in the subsequent package step. The first and second mantle layers 22, 32 of the instant disclosure are double-layered structure. Each of the first and second mantle layers 22, 32 consists of an inner connection layer 221, 321 made of Ni (nickel) and an outer soldering layer 222, 322 made of Sn (stannum), where the materials are not restricted thereto.

In order to further explain the present invention, the anode terminal 2 includes a first electrical contact portion 2a and a first lead-out portion 2b defined thereon. The cathode terminal 3 includes a second electrical contact portion 3a and a second lead-out portion 3b defined thereon. As shown in FIG. 3 and FIG. 5, the first and second electrical contact portions 2a, 3a are disposed inside a package body 4 and electrically connected to a capacitor unit 1. For example, the first and second electrical contact portions 2a, 3a respectively and electrically contact the anode portion P and the cathode portion N of the lowest stacked-type capacitor 10. The first and second lead-out portions 2b, 3b are disposed outside the package body 4, configured to be mounted on an edge of a circuit board (not shown).

In the next step S102, a portion of the first mantle layer 22 is removed from the surface of the first core layer 21 of the anode terminal 2 via laser trimming. In other words, the first core layer 21 has a first exposed surface 211 exposed from the first mantle layer 22. The first through-hole 212 partially penetrates the first exposed surface 211 of the first mantle layer 22. Similarly, a portion of the second mantle layer 32 is removed from the surface of the second core layer 31 of the cathode terminal 3 via laser trimming. In other words, the second core layer 31 has a second exposed surface 311 exposed from the second mantle layer 32. The second through-hole 312 partially penetrates the second exposed surface 311 of the second mantle layer 32. It should be particularly noted that said laser trimming process have the advantages of wide engraving range, high engraving speed, high engraving quality, low energy consumption, prevention of chemical toxic agent caused pollution, etc. Thus, the laser trimming process can be applied on the conductive terminal, so that the mantle layer thereof can be quickly and exactly patterned (i.e., selectively removing the mantle layer from the core layer of the conductive terminal).

Figure 6:
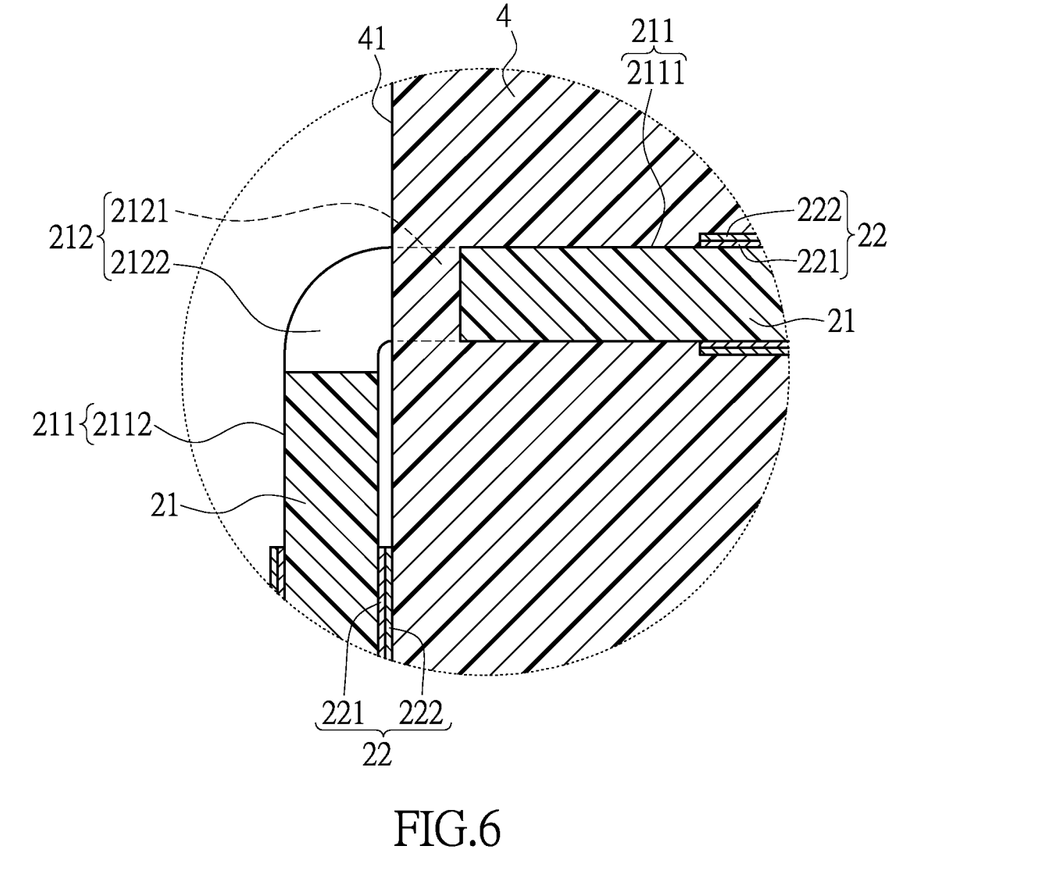
FIG. 6 shows an enlarged view taken on part A of FIG. 5.
Figure 7:
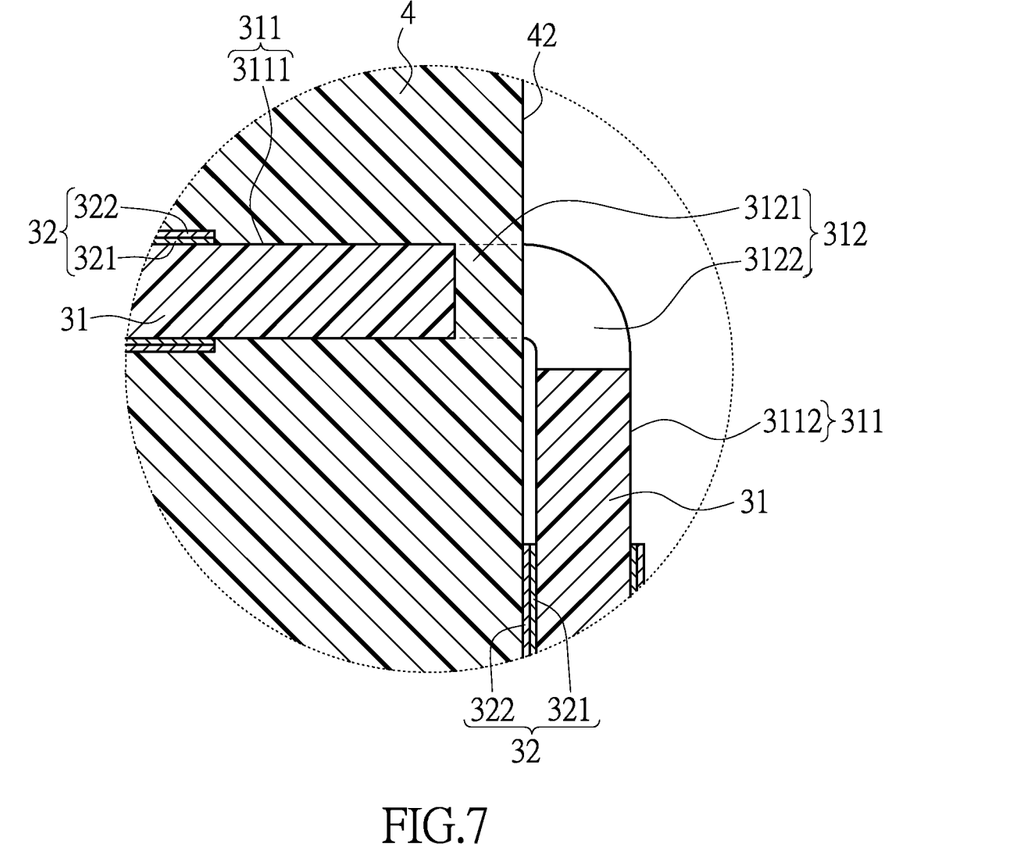
FIG. 7 shows an enlarged view taken on part B of FIG. 5.

Specifically, the first exposed surface 211 extends a distance forward and downward from the junction of the first electrical contact portion 2a and the first lead-out portion 2b of the anode terminal 2. The first exposed surface 211 has a first junction region 2111 and a first bending region 2112. The second exposed surface 311 extends a distance forward and downward from the junction of the second electrical contact portion 3a and the second lead-out portion 3b of the cathode terminal 3. The second exposed surface 311 has a second junction region 3111 and a second bending region 3112.

To further explain the step S102, various semiconductor laser and fiber lasers can be used in the laser trimming process. For example, a semiconductor laser can produce red, green, and blue light, adapted to be performed on the surface of the first and second mantle layers 22, 32. Thus, a predetermined portion of the first or second mantle layer 22, 32 can be removed via laser corrosion, laser devolatilization, or photochemical reaction. Preferably, the laser operating parameters comprises: processing speed parameter in a range between 500-3000 mm/s, wavelength parameter of 1060 nm, power output parameter in a range between 10-100 W, and frequency parameter in a range between 25-250 KHz.

In the next step S104, a plurality of stacked-type capacitors 10 are stacked above the anode terminal 2 and the cathode terminal 3. The stacked-type capacitors 10 are also electrically connected to one another in parallel to form a capacitor unit 1. For each stacked-type capacitor 10, the anode portion P and the cathode portion N are electrically connected to the anode terminal 2 and the cathode terminal 3 respectively. When stacking the stacked-type capacitors 10, anode welding is performed between the neighboring anode portions P, and the neighboring cathode portions N are electrically connected to each other via its electrode layers 13.

In the next step S106, a molding material, such as an opaque material (i.e. epoxy or silicone), is applied to the capacitor unit 1, the anode terminal 2, and the cathode terminal 3. Thus, the package body 4 is formed to encapsulate the capacitor unit 1, the first electrical contact portion 2a of the anode terminal 2, and the second electrical contact portion 3a of the cathode terminal 3. The first lead-out portion 2b of the anode terminal 2 and the second lead-out portion 3b of the cathode terminal 3 are located outside the package body 4. In this way, there is a first filling portion 2121 filled with the package body 4 and a first unoccupied portion 2122 connected with the first filling portion 2121 in the first through-hole 212 and outside the package body 4. There is a second filling portion 3121 filled with the package body 4 and a second unoccupied portion 3122 connected with the second filling portion 3121 in the second through-hole 312 and outside the package body 4.

It should be particularly noted that the junction of the package body 4 and the anode terminal 2 is at the first exposed surface 211, and the junction of the package body 4 and the cathode terminal 3 is at the second exposed surface 311. Specifically, the first junction region 2111 of the first exposed surface 211 and the second junction region 3111 of the second exposed surface 311 are covered with the package body 4. Because of the surface roughness of the laser-treated first and second exposed surfaces 211, 311, the sealing property between the package body 4 and the anode terminal 2 and the sealing property between the package body 4 and the cathode terminal 3 can be improved.

In addition, during the laser trimming process, the thickness of the oxide layers which are continually generated on the surfaces of the first and second core layers 21, 31 made of Cu or Cu alloy can be decreased under an inert gas atmosphere. The above technical means will contribute to perfecting the sealing properties between the package body 4 and the anode or cathode terminal.

In the next step S108, the first lead-out portion 2b of the anode terminal 2 and the second lead-out portion 3b of the cathode terminal 3 are bent along an outer surface of the package body 4. Specifically, the first lead-out portion 2b of the anode terminal 2 begins to bend from the first bending region 2112 of the first exposed surface 211 to form an L-shaped bending part. The second lead-out portion 3b of the cathode terminal 3 begins to bend from the second bending region 3112 of the second exposed surface 311 to from another L-shaped bending part. The package body 4 has a first lateral surface 41, a second lateral surface 42 opposite to the first lateral surface 41, and a bottom surface 43 between the first lateral surface 41 and the second lateral surface 42. The first lead-out portion 2b of the anode terminal 2 extends along the first lateral surface 41 and the bottom surface 43 of the package body 4. The second lead-out portion 3b of the cathode terminal 3 extends along the second lateral surface 42 and the bottom surface 43 of the package body 4.

The solid electrolytic capacitor package structure with improved conductive terminals Z will be made after the completion of the above-mentioned steps (S100 to S108).

Advantages of Embodiments

Please refer to Table 1. It illustrates characteristics of the solid electrolytic capacitor package structure manufactured by the method using the laser operating parameters mentioned above and the conventional products. In the table, ○ represents "Good", Δ represents "Fair", and X represents "Failure".

TABLE 1

| Sample | Dry-type process | Test time (hours) | ESR value | capacitance increment rates after steam aging | Sealing characteristic | Comprehensive evaluation of all characteristics |
|---|---|---|---|---|---|---|
| Control group A | Chemical etching | 6.5 | 6.2-16.5/8.2 | 4.65%-30.42%/10.00% | X-Δ | X |
| Control group B | Chemical etching | 8 | 10.0-14.3/11.5 | 7.43%-42.30%/14.07% | X-Δ | X |
| Example A | Laser trimming (Redlight laser) | 6.5 | 8.2-13.1/9.5 | 7.47%-15.82%/11.68% | Δ-○ | ○ |
| Example B | Laser trimming (Redlight laser) | 6.5 | 6.8-10.5/8.3 | 5.31%-10.00%/7.94% | ○ | ○ |

TABLE 1-continued

| Sample | Dry-type process | Test time (hours) | ESR value | capacitance increment rates after steam aging | Sealing characteristic | Comprehensive evaluation of all characteristics |
|---|---|---|---|---|---|---|
| Example C | Laser trimming (Greenlight laser) | 6.5 | 10.4-20.7/14.7 | 6.94%-11.02%/9.84% | ○ | Δ |
| Example D | Laser trimming (Greenlight laser) | 6.5 | 6.8-8.9/7.9 | 9.67%-18.62%/12.62% | Δ-○ | Δ |
| Example E | Laser trimming (Fiber laser) | 6.5 | 11.7-25.3/16.3 | 7.93%-17.52%/10.52% | Δ-○ | X |
| Example F | Laser trimming (Fiber laser) | 6.5 | 9.2-18.0/13.3 | 6.10%-11.78%/9.49% | ○ | Δ |

Consequently, the present invention proposes a new method for partially removing the mantle layers of the anode and cathode terminals by a laser trimming process, preferably with red light laser based on specific laser operating parameters, which is configured to replace the conventional chemical etching process. Therefore, the junction of the package body and the anode or cathode terminal can be located at the exposed surface of laser treatment to improve the sealing property. Base on the above, the capacitor package structure made by the instant method can simultaneously meet the requirements of low ESR value and good capacitance increment rate performance.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A method for making solid electrolytic capacitor package structure with improved conductive terminals, comprising the following steps:
   providing at least one conductive terminal having a core layer and a mantle layer enclosing the core layer;
   removing a portion of the mantle layer by a laser trimming process to form a junction region and a bending region on an exposed surface of the core layer, wherein the laser trimming process is performed under operating parameters including a processing speed range between 500-3000 mm/s, a laser wavelength of 1060 nm, a power output range between 10-100 W, and a laser frequency range between 25-250 KHz;
   sequentially stacking together a plurality of stacked-type capacitors to form a capacitor unit and electrically connecting the capacitor unit to the at least one conductive terminal;
   forming a package body to encapsulate the capacitor unit, wherein the at least one conductive terminal has an electrical contact portion enclosed by the package body and a lead-out portion outside the package body, and wherein the junction region is covered by the package body; and
   bending the lead-out portion of the at least one conductive terminal to an axis that extends along the surface of the package body.

2. The method for making the solid electrolytic capacitor package structure with improved conductive terminals according to claim 1, wherein the step of forming the package body to encapsulate the capacitor unit comprises forming a through-hole in the electrical contact portion of the at least one conductive terminal by stamping, and the through-hole partially penetrates said exposed surface.

3. The method for making the solid electrolytic capacitor package structure with improved conductive terminals according to claim 2, wherein the through-hole has a filling portion filled with the package body and an unoccupied portion connected with the filling portion and outside the package body.

4. A method for making solid electrolytic capacitor package structure with improved conductive terminals, comprising the following steps:
   providing an anode terminal and a cathode terminal separated from the anode terminal, wherein the anode terminal has a first core layer and a first mantle layer enclosing the first core layer, and the cathode terminal has a second core layer and a second mantle layer enclosing the second core layer;
   removing a portion of the first mantle layer and a portion of the second mantle layer by a laser trimming process to form a first junction region and a first bending region on an exposed surface of the first core layer and a second junction region and a second bending region on an exposed surface of the second core layer, wherein the laser trimming process is performed under operating parameters including a processing speed range between 500-3000 mm/s, a laser wavelength of 1060 nm, a power output range between 10-100 W, and a laser frequency range between 25-250 KHz;
   sequentially stacking together a plurality of stacked-type capacitors to form a capacitor unit and electrically connecting the capacitor unit to the anode terminal and the cathode terminal;
   forming a package body to encapsulate the capacitor unit, wherein the anode terminal includes a first electrical contact portion enclosed by the package body and a first lead-out portion outside the package body and the cathode terminal includes a second electrical contact portion enclosed by the package body and a second lead-out portion outside the package body, and wherein the first junction region and the second junction region are covered by the package body; and
   bending the first lead-out portion of the anode terminal and the second lead-out portion of the cathode terminal to an axis that extends along the surface of the package body.

5. The method for making the solid electrolytic capacitor package structure with improved conductive terminals according to claim 4, wherein the step of forming the package body to encapsulate the capacitor unit comprises forming a first through-hole in the first electrical contact portion of the anode terminal and a second through-hole in the second electrical contact portion of the cathode terminal by stamping, the first through-hole partially penetrates said first exposed surface, and the second through-hole partially penetrates said second exposed surface.

6. The method for making the solid electrolytic capacitor package structure with improved conductive terminals according to claim 5, wherein the first through-hole has a first filling portion filled with the package body and a first unoccupied portion connected with the first filling portion and outside the package body, and the second through-hole has a second filling portion filled with the package body and a second unoccupied portion connected with the second filling portion and outside the package body.

* * * * *